Jan. 11, 1927.

A. E. TUTTLE 1,613,682

APPARATUS FOR MAKING PLASTER AND MORTAR

Filed Nov. 14, 1924    3 Sheets-Sheet 1

Inventor:
Albert E. Tuttle,
by Walter E. Lombard,
Atty.

Jan. 11, 1927.
A. E. TUTTLE
1,613,682
APPARATUS FOR MAKING PLASTER AND MORTAR
Filed Nov. 14, 1924    3 Sheets-Sheet 2
Fig. 3.
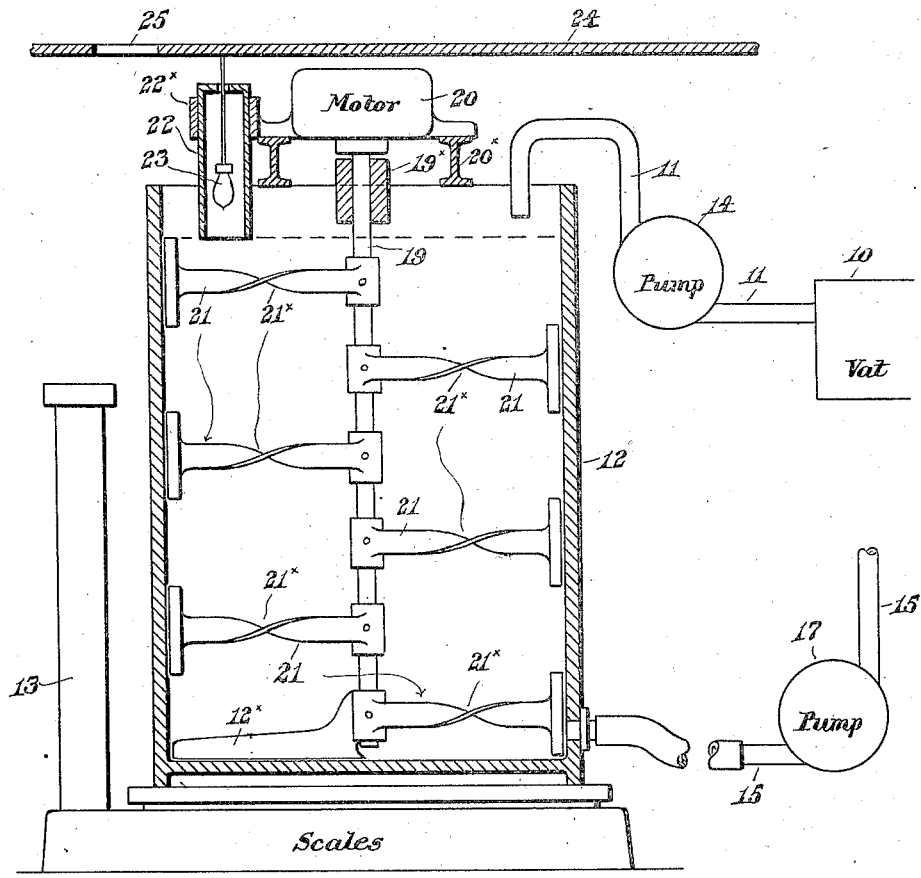
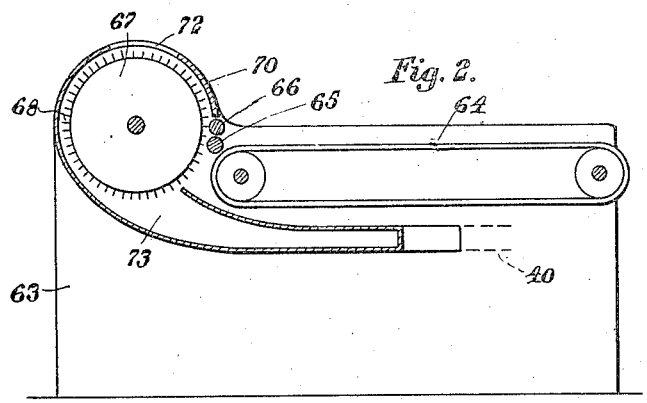
Fig. 2.
Inventor:
Albert E. Tuttle,
by Walter E. Lombard,
Atty.

Jan. 11, 1927.

A. E. TUTTLE 1,613,682

APPARATUS FOR MAKING PLASTER AND MORTAR

Filed Nov. 14, 1924    3 Sheets-Sheet 3

Inventor:
Albert E. Tuttle,
by Walter E. Lombard.
Atty.

Patented Jan. 11, 1927.

1,613,682

UNITED STATES PATENT OFFICE.

ALBERT EDWARD TUTTLE, OF BOSTON, MASSACHUSETTS, ASSIGNOR TO BLUE DIAMOND MATERIALS CO., OF BOSTON, MASSACHUSETTS, A CORPORATION OF MASSACHUSETTS.

APPARATUS FOR MAKING PLASTER AND MORTAR.

Application filed November 14, 1924. Serial No. 749,845.

This invention relates to the making of plaster and mortar having a lime base, and its object is to produce by a comparatively simple process a superior quality of such material in which the ingredients may be very accurately proportioned, thereby giving uniformity in composition to any given quantity of the product.

A further object of the invention is the provision of apparatus whereby the process may be carried out expeditiously and at a minimum expense.

A further object is the provision in said apparatus of means whereby the ingredients to be used in carrying out the process may be accurately measured prior to being incorporated in the mixture.

These objects are attained by the mechanism illustrated in the accompanying drawings.

For the purpose of illustrating the invention, one preferred form thereof is illustrated in the drawings, this form having been found to give satisfactory and reliable results although it is to be understood that the various instrumentalities of which the invention consists can be variously arranged and organized and the invention is not limited to the precise arrangement and organization of these instrumentalities as herein shown and described except as required by the scope of the appended claims.

Of the drawings:

Figure 2 represents a vertical section of the picker mechanism.

Figure 3 represents a vertical section of another portion of said apparatus with the pumps and vat connected therewith shown in diagram.

Similar characters indicate like parts throughout the several figures of the drawings.

Figure 1:
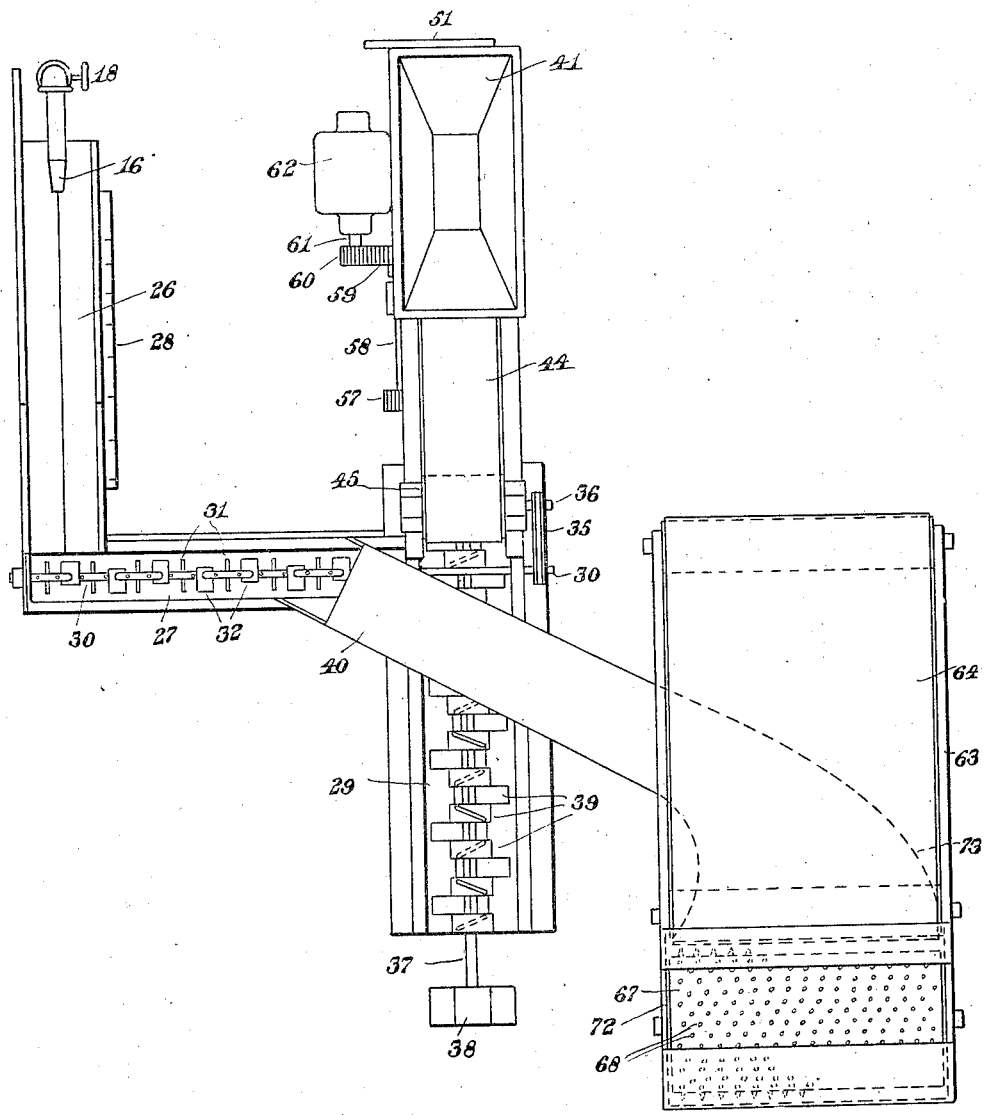
Figure 1 represents a plan of a portion of an apparatus embodying the principles of the present invention.

In the drawings 10 is a storage vat which contains a supply of lime putty suitably treated so that it is in condition to flow freely.

This vat 10 is connected by a pipe 11 to a measuring tank 12 mounted upon weighing scales 13 which may be of any well known construction.

The tank 12 is preferably cylindrical and the pipe 11 connects with the top thereof, said pipe having a pump 14 which is adapted to force the lime putty into said tank 12 from the source of supply 10.

The tank 12 also has a delivery pipe 15 extending therefrom with its delivery end provided with a nozzle 16.

The pipe 15 is provided with a pump 17 adapted to draw the putty from the tank 12 and discharge it under pressure through the nozzle 16.

Between the pump 17 and nozzle 16 is a valve 18 adapted to control the discharge of putty through the nozzle 16.

The tank 12 is preferably vertical and has centrally disposed therein a revoluble shaft 19 rotated in a bearing $19^x$ by a motor 20 of usual construction.

The shaft 19 is provided with a plurality of radial arms 21 having blades on the end thereof which, when the shaft 19 is rotating, prevents the putty from caking upon the inner face of the wall of the tank 12.

The top of the tank 12 is open and extending downwardly therein is a cylindrical hood or enclosure 22 open at the bottom in which is disposed a lamp 23 which, when lighted, projects a beam of light onto the top of the contents of the tank.

The bottom of the enclosure 22 is at a predetermined level in order that the exact measurement of the putty may be determined when it reaches this level.

The tank is positioned beneath the floor 24 on which are positioned the various devices for delivering to the lime putty the various ingredients to make the plaster which devices will be hereinafter described.

This floor 24 has an opening 25 therein through which an operator may see the beam of light on the contents of tank 12.

When the putty reaches the predetermined level its cubic contents are known as the height of the putty and diameter of tank 12 have previously been determined, and if at this time the weight is determined of the putty within the tank, its specific gravity may be readily calculated by the usual methods.

As shown in the drawing the delivery end of the pipe 15 is horizontal and the nozzle 16 is above one end of a chute 26 slightly inclined, the lower end being positioned above one end of a stirring trough 27.

In advance of the nozzle 16, below and at one side thereof is a fixed scale 28 by which the length of the jet of lime putty discharged from the nozzle 16 may be determined.

Knowing the specific gravity of the lime putty as is is delivered from the tank 12, the consistency of the putty as discharged may be obtained readily.

In order to avoid the necessity of making calculations from time to time, the proper data may be supplied from a table or chart previously prepared and posted in view of the operator.

For any specific gravity of lime putty in the tank any quantity of material being discharged from the nozzle 16 may be attained by adjusting the valve 18 so that the jet of material will have the exact length provided for in said table or chart.

In other words, having found the specific gravity of the lime putty in the tank 12, the operator knowing the quantity of normal putty desired for the particular plaster being made, looks at his table or chart under "specific gravity" finds a reading thereon for the exact length of jet of material required to obtain the desired mixture.

It has been found in practice that by carrying out this method a very superior plaster may be made, the consistency of which will be uniform throughout the particular lot being manufactured.

Should lime putty from a different source of supply and of a different specific gravity be pumped under pressure to the nozzle 16, the equivalent mixture as before could be obtained by adjusting the controlling valve 18 to obtain a different length of jet as provided for in said table or chart.

In the manufacture of plaster it is absolutely necessary in order to obtain a desired superiority of product that a certain proportion of normal lime putty or equivalent should be employed which would coordinate correctly with the measured quantities of other ingredients entering into the combination.

Moreover, this proportion may vary relatively to the other ingredients used according to the particular job on which the plaster is to be used.

By reference to the table or chart the right combination may be readily determined and the valve 18 set in accordance therewith to obtain just the desired quantity of normal lime putty or equivalent to be mixed with the measured quantities of sand and bonding material to produce a plaster the ingredients of which will be properly proportioned for the particular work to be done.

This means of determining the consistency of the lime putty forms a very important feature of the present invention as by its use a more uniform product is obtained than it has been possible to attain heretofore.

The trough 27 is slightly inclined with its lower end opening into the side of one end of a mixing receptacle 29.

The trough 27 has a revoluble shaft 30 extending lengthwise thereof, said shaft having a plurality of radial stirring pins 31 and a plurality of blades 32 so inclined that as the shaft 30 rotates these blades will force the lime putty lengthwise of said trough and discharge it in the mixing receptacle 29.

The shaft 30 extends across the receptacle 29 and has a sprocket wheel 33 thereon connected by a chain 34 with a sprocket wheel 35 on a shaft 36 forming a part of a sand supplying device to be hereinafter described.

The mixing receptacle has a shaft 37 extending lengthwise thereof, rotatable in bearings 38 and this shaft has secured thereto a plurality of mixing blades 39 extending radially therefrom.

These blades 39 are inclined in such a manner that while mixing the ingredients in the receptacle 29 they will force said material toward the open end of said receptacle from which it will be discharged ready for use.

Communicating with the trough 27 is a conduit 40 the opposite end of which communicates with a picker mechanism adapted to pick hair or some similar material, dispose of the lumps therein, separate therefrom fine shreds thereof suitable for a bonding material and blow the shreds into the lime putty as it is stirred in the trough 27.

By this means the shreds of bonding material are thoroughly incorporated in the lime putty while in the trough 27 and before it is discharged into the receptacle 29 where a measured quantity of sand is mixed with the lime putty.

It has been found in practice that a superior product is assured when the bonding material is mixed with the lime putty prior to the mixing of sand therewith.

The mechanism for supplying sand to the mixing receptacle consists of a hopper 41 the lower end of which has vertical side walls 42 and an end wall 43.

Figure 4:
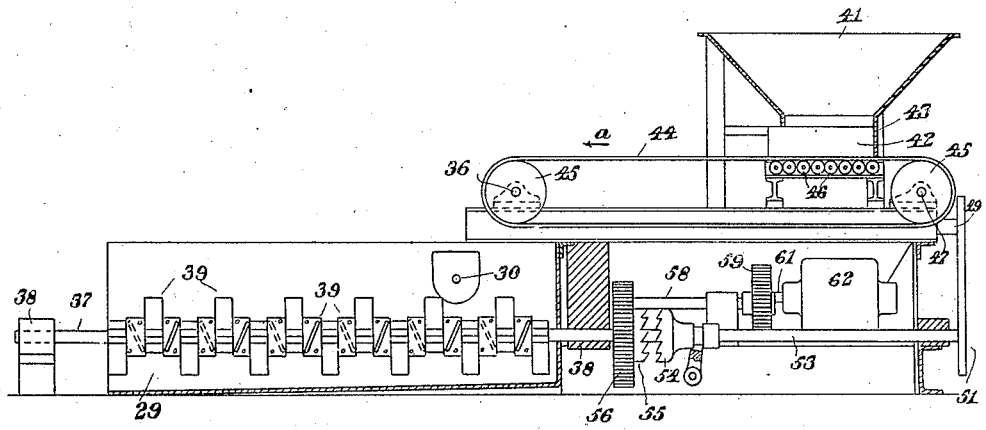
Figure 4 represents a vertical section of the mixing receptacle and sand delivering mechanism.
Figure 5:
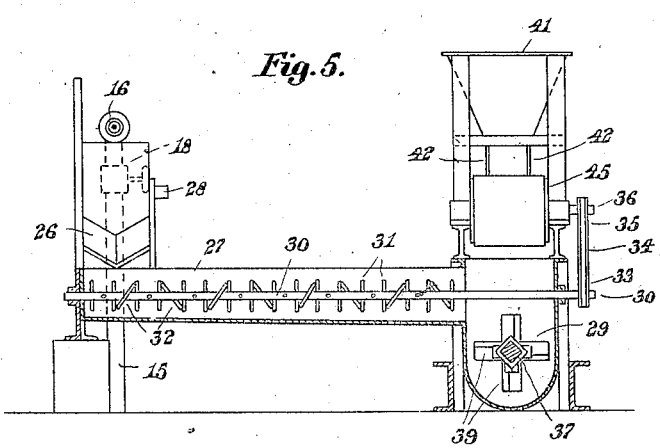
Figure 5 represents a vertical section of the stirring trough and mixing receptacle and showing in elevation the devices for delivering lime putty to said trough and sand to said receptacle.
Figure 6:
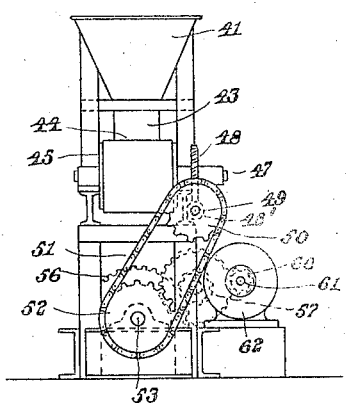
Figure 6 represents an end elevation of the sand delivering mechanism.

Beneath the walls 42, 43 is an endless apron 44 mounted on rollers 45 and movable in the direction of the arrow $a$ on Fig. 4 of the drawings.

The delivery end of the apron 44 is immediately above stream of lime putty as it it discharged from the trough 27 into the receptacle 29 so that the sand upon said apron will be dropped upon the stream of putty and become mixed therewith; a more thorough mixture being made by the blades 39 as they rotate in the receptacle 29.

Under the apron 44 and immediately beneath the open lower end of said hopper 41 are several supporting rolls 46 which prevent the apron 44 from sagging at this point under the weight of the sand in hopper 41.

One of the apron rollers 45 is mounted upon the shaft 36, the rotary movement of which is imparted to the revoluble shaft 30 in the mixing trough 27.

The other roller 45 has a shaft 47 to which is secured a worm wheel 48, meshing with a worm 48′ on the shaft 49 having secured thereto a sprocket wheel 50 connected by endless chain 51 with a sprocket wheel 52 on a shaft 53 having a slidable clutch member 54 splined to its opposite end.

This clutch member 54 is adapted to be moved into engagement with the clutch member 55 when it is desired to actuate the apron 44 and the shaft 30.

The clutch member 55 is secured to the shaft 37 of the mixing chamber 29, this shaft also having secured thereto a gear 56 meshing with a pinion 57 on a shaft 58 having secured thereto a gear 59 which meshes with a pinion 60 on the revoluble shaft 61 of the motor 62.

When the motor is in operation the shaft 37 will be rotated but the apron 44 and shaft 30 will not be actuated until the clutch members 54, 55 are brought into engagement. This mechanism will deliver continuously a uniform quantity to the mixing receptacle, the sand on the apron 44 having an equal height and width.

The picker mechanism consists of a frame 63 having an endless apron 64 thereon, on which curled hair or similar material is fed between two rollers 65, 66 toward the periphery of a revoluble drum 67 having a plurality of picker points 68 extending from the periphery thereof.

The drum 67 is rotated at a high rate of speed, said drum being positioned with a casing 70, which casing has an opening 72 therein through which may be discharged lumps or unshredded portions of said hair.

The fine shreds or fluff of said hair will be drawn into a passage 73 by means of the draught of air caused by the rapid rotation of the drum 67, the opposite end of this passage 73 communicating with the conduit 40 leading to the trough 27.

This fluff or shredded hair will be blown continuously through the conduit 40 into the top of the trough 27 where it will be caught by the flowing lime putty in said trough and will be mixed therewith while the lime putty is being stirred.

The feed rollers 65, 66 and apron 64 will be moved at a slow rate of speed.

The drum, rollers and apron may be actuated by any suitable mechanism at the required rates of speed but as the picker mechanism, as such, forms no part of the present invention it is deemed unnecessary to show and describe any particular driving mechanism.

Preferably the arms 21 are twisted as indicated at $21^x$ so that during the rotation of the shaft 19 these arms will stir the putty contained in the tank 12.

In order to prevent the putty caking upon the bottom of the tank 12, the shaft 19 is provided with a scraper $12^x$, the lower edge of which is closely adjacent the bottom of said tank.

The motor 20 is mounted on supports $20^x$ secured to the upper end of the tank 12 and extending from the motor casing is a bracket $22^x$ supporting the enclosure 22.

"Lime putty" is a general term used by the trade to indicate a mixture of hydrate of lime and water and specifies no particular proportion of ingredients.

The purpose of the present invention is to provide means for determining what these proportions are prior to the introduction of the putty into the mixture.

For instance, having determined the specific gravity of the putty as it is discharged from the tank 12, it is obvious that by means of the scale 28, the exact consistency of the lime putty may be readily obtainable as said putty is discharged from the nozzle 16.

This being the case, it is self-evident that after this consistency has been determined, the valve 18 may be adjusted so that the desired quantity of putty may be ejected for a given quantity of sand.

This scale 28 is calibrated so that the markings thereon indicate the rate of flow per minute of the putty being ejected from the nozzle 16 and the rate of flow is determined by the specific gravity of the putty and the particular mixture desired.

If the specific gravity is more than normal a less quantity of putty is required in the mixture, and if the specific gravity is less than normal a greater quantity of putty must be discharged from the nozzle in order to increase the amount of putty being introduced into the mixture.

Having determined what is the specific gravity of the putty the chart or table informs the operator of the length of jet which should be ejected from the nozzle 16 for any given quantity of sand.

By these means the proper consistency of the final product may always be predetermined.

This makes a very simple but effective method of making plaster and the like, said plaster having a uniform consistency throughout and in which the desired proportions of sand and putty may be maintained indefinitely, thus insuring a very superior quality of product.

It is believed that the operation and many advantages of the invention will be apparent without further description.

Having thus described my invention, I claim:

1. The combination of a receptacle containing a supply of lime putty; a delivery pipe extending therefrom; a pump associated with said pipe for forcing the putty from the delivery end of the pipe in a continuous jet; a regulating valve in said pipe between the pump and said delivery end; and means independent of said valve for measuring the length of said jet and thereby determining the setting of said valve.

2. The combination of a receptacle containing a supply of lime putty; a delivery pipe extending therefrom; a rotary pump associated with said pipe for forcing the putty from the delivery end of the pipe in a continuous jet; a regulating valve in said pipe between the pump and said delivery end; and a jet-measuring scale in advance of said delivery end parallel to and at one side of said jet.

3. The combination of a receptacle containing a supply of lime putty; a delivery pipe extending therefrom; a nozzle on the delivery end of said pipe reduced in diameter at its outer end; a pump associated with said pipe for forcing the putty in a continuous jet from said nozzle; a regulating valve in said pipe between said pump and nozzle; and a jet-measuring scale in advance of the nozzle parallel to and at one side of said jet.

4. The combination of a chute; a pipe leading thereto from a supply of lime putty; a pump associated with said pipe adapted to force the putty under pressure in a continuous jet from the delivery end of said pipe lengthwise of said chute; a regulating valve in said pipe between said pump and delivery end; and means extending lengthwise of said chute for determining the quantity of lime putty being delivered.

5. The combination of a chute; a pipe leading thereto from a supply of lime putty; a rotary pump associated with said pipe for forcing the putty under pressure in a continuous jet from the delivery end of the pipe; a regulating valve in the pipe between the pump and said delivery end; and means at one side of and parallel to said jet for measuring the length of said jet.

6. The combination of a chute; a pipe leading thereto from a supply of lime putty; a rotary pump associated with said pipe for forcing the putty under pressure in a continuous horizontal jet from the delivery end of said pipe; a regulating valve in the pipe between said pump and delivery end, and a horizontally disposed scale parallel with said jet and at one side thereof for measuring the exact length of said jet.

7. The combination of an inclined mixing receptacle; a trough the delivery end of which extends through the side of said receptacle and adapted to deliver thereto a supply of lime putty; a shaft in said receptacle provided with a plurality of radial mixing blades; a gear on said shaft; means for imparting rotary movement to said gear; a clutch member revoluble with said gear; an endless apron one end of which projects over the upper end of said receptacle; means for depositing sand only on said apron; and driving mechanism for said apron including a clutch member adapted to coact with the clutch member revoluble with said gear.

8. The combination of an inclined mixing receptacle; a trough adapted to deliver through one side of said receptacle a supply of lime putty; a shaft in said receptacle provided with a plurality of radial mixing blades; a plurality of radial pins interposed between said blades; a gear on said shaft; means for imparting rotary movement to said gear; a clutch member revoluble with said gear; an endless apron one end of which projects over the upper end of said receptacle; driving mechanism for said apron including a clutch member adapted to coact with the clutch member revoluble with said gear; and means for depositing upon said apron a measured quantity of sand only to be delivered to said receptacle.

9. The combination of a trough; means for delivering lime putty to one end thereof; a mixing receptacle communicating with the opposite end of said trough; means for stirring the lime putty in said trough; a picker mechanism adapted to shred a bonding material and consisting in part of a revoluble drum rotated at a high rate of speed; a casing for said drum; and a conduit from said casing extending to the top of said trough and adapted to deliver thereto the shreds of bonding material from said picker mechanism.

10. The combination of a trough; means for delivering lime putty to one end thereof; a mixing receptacle communicating with the opposite end of said trough; means for stirring the lime putty in said trough; a picker mechanism adapted to shred a bonding material and consisting in part of a revoluble drum rotated at a high rate of speed; a casing for said drum having an opening therein through which is discharged the unshredded portions of said bonding material; and a conduit from said casing extending to the top of said trough and adapted to deliver thereto the shreds of bonding material from said picker mechanism.

11. The combination of a pipe for delivering lime putty in a fluid state; means for determining the consistency of said lime putty; a stirring trough; and means including a delivery nozzle on the end of said pipe for discharging said putty into said trough at a predetermined rate.

12. The combination of a pipe for delivering lime putty in a fluid state; means for determining the consistency of said lime putty; a stirring trough; and means including a delivery nozzle on the end of said pipe for discharging said putty under pressure into said trough at a predetermined rate.

13. The combination of a pipe for delivering lime putty in a fluid state; means for determining the consistency of lime putty; a stirring trough; means including a delivery nozzle on the end of said pipe for discharging said putty under pressure into said trough; and means whereby the rate of such discharge may be determined.

14. The combination of a pipe for delivering lime putty in a fluid state; means for determining the consistency of lime putty; a stirring trough; means including a delivery nozzle on the end of said pipe for discharging said putty under pressure into said trough; means for controlling said discharge; and means whereby the rate of said discharge may be determined.

15. An apparatus for manufacturing plaster consisting of means for weighing given amounts of lime putty in a fluid state pumped from a storage vat into a tank; a pipe leading from said tank to a discharge nozzle; a controlling valve in said pipe; a pump for discharging the material through said nozzle under pressure; a scale adjacent said nozzle for determining the length of jet discharged; a stirring trough to receive said material; means for discharging a binder into said trough; a mixing receptacle to receive the stirred material and binder; and means for delivering measured quantities of sand to said receptacle.

16. An apparatus for manufacturing plaster consisting of means for weighing given amounts of lime putty in a fluid state pumped from a storage vat into a tank; a pipe leading from said tank to a discharge nozzle; a controlling valve in said pipe; a pump for discharging the material through said nozzle under pressure; a scale adjacent said nozzle for determining the length of jet discharged; a stirring trough to receive said material; means for blowing quantities of hair into the material in said trough; a mixing receptacle to receive the stirred material and hair; and means for delivering measured quantities of sand to said receptacle.

17. An apparatus for manufacturing plaster consisting of means whereby the specific gravity of given amounts of lime putty in a fluid state pumped from a storage vat into a tank may be obtained; a pipe leading from said tank to a discharge nozzle; a controlling valve in said pipe; a pump for discharging the material through said nozzle under pressure; a scale adjacent said nozzle for determining the length of jet discharged; a stirring trough to receive said material; means for discharging a binder into said trough; a mixing receptacle to receive the stirred material and binder; and means for delivering measured quantities of sand to said receptacle.

18. An apparatus for manufacturing plaster consisting of a tank adapted to contain lime putty in a fluid state; a discharge nozzle; a pipe therefor through which the putty in said tank is forced under pressure; a controlling valve in said pipe; means for determining the length of jet from said nozzle; a trough to receive the discharged putty; means for delivering a binder to said trough; stirring means in said trough; a mixing receptacle to receive the stirred material and binder; and mechanism for delivering sand to said mixing receptacle.

19. An apparatus for manufacturing plaster consisting of a tank adapted to contain lime putty in a fluid state; a discharge nozzle; a pipe therefor through which the putty in said tank is forced under pressure; a controlling valve in said pipe; means independent of said valve for determining the length of jet from said nozzle; a trough to receive the discharged putty; means for delivering a binder to said trough; stirring means in said trough; a mixing receptacle to receive the stirred material and binder; and mechanism for delivering sand onto the stirred mixture as it is delivered to said mixing receptacle.

20. The combination of a mixing trough; a chute at right angles to said trough and leading to one end thereof; a pipe leading to said chute from a supply of lime putty; a rotary pump associated with said pipe for forcing the putty from the delivery end of said pipe in a continuous jet above and lengthwise of said chute; a regulating valve in said pipe between said pump and delivery end; and means extending lengthwise of said chute for measuring the exact length of said jet.

Signed by me at 746 Old South Bldg., Boston, Mass., this 8th day of November, 1924.

ALBERT EDWARD TUTTLE.